(12) United States Patent
Edelson et al.

(10) Patent No.: US 7,464,549 B1
(45) Date of Patent: Dec. 16, 2008

(54) POLYPHASE HYDRAULIC DRIVE SYSTEM (75) Inventors: Jonathan Sidney Edelson, Sommerville, MA (US); Wayne Boyer Collier, New York, NY (US)

(73) Assignee: Borealis Technical Limited (GI)

( * ) Notice: Subject to any disclaimer, the term of this patent is extended or adjusted under 35 U.S.C. 154(b) by 0 days.

(21) Appl. No.: 11/326,162

(22) Filed: Jan. 4, 2006

Related U.S. Application Data (60) Provisional application No. 60/641,622, filed on Jan. 4, 2005.

(51) Int. Cl.
*F15B 7/02* (2006.01)
(52) U.S. Cl. .......................................... 60/536; 92/12.1
(58) Field of Classification Search .................. 60/536; 91/487, 497; 92/12.1
See application file for complete search history.

(56) References Cited

U.S. PATENT DOCUMENTS

| | | | | |
|---|---|---|---|---|
| 1,432,673 | A | * | 10/1922 | Constantinesco ............ 60/536 |
| 1,612,888 | A | * | 1/1927 | Schneggenburger ......... 91/497 |
| 2,186,556 | A | | 9/1940 | Robbins |
| 3,086,477 | A | * | 4/1963 | Ruh ............................. 91/497 |
| 3,765,183 | A | | 10/1973 | Baurle |
| 3,961,558 | A | | 6/1976 | Dokukin et al. |
| 3,983,700 | A | * | 10/1976 | Barrett ......................... 91/497 |
| 5,224,411 | A | | 7/1993 | Fillion |
| 5,657,681 | A | | 8/1997 | Henricson |
| 5,689,956 | A | | 11/1997 | Reboredo |
| 5,956,953 | A | | 9/1999 | Folsom et al. |
| 6,279,520 | B1 | | 8/2001 | Lowi, Jr. |
| 6,837,141 | B1 | | 1/2005 | Edelson |

* cited by examiner

*Primary Examiner*—F. Daniel Lopez (57) ABSTRACT

The present invention comprises an input drive system, which provides a plurality of phases of oscillating fluid flow, and an output drive system connected directly to the input drive system that is powered by the plurality of phases of oscillating fluid flow. The input drive system comprises a plurality of pistons that are caused to move in a reciprocating fashion by a power source. The power source may be a rotating power source, such as that provided by an electric motor, a diesel or petrol engine, or a turbine system. The input drive system comprises a cam ring attached to a rotating power source; a plurality of cam rollers in contact with the cam ring; and a plurality of pistons attached to the cam rings. The output drive system comprises one or more pistons that are caused to move in a reciprocating fashion by the oscillating fluid flow provided by the input drive system. The output drive system comprises a cam ring attached to a load; a plurality of cam rollers in contact with the cam ring; and a plurality of pistons attached to the cam rings.

3 Claims, 7 Drawing Sheets

POLYPHASE HYDRAULIC DRIVE SYSTEM

CROSS-REFERENCE TO RELATED APPLICATIONS

This application claims the benefit of U.S. Provisional Application No. 60/641,622, filed Jan. 4, 2005.

BACKGROUND OF THE INVENTION

The present invention relates to hydraulic drive systems for gear-less inter-conversion of rotational energy and gear-less conversion of rotational energy to linear kinetic energy.

Henricson (U.S. Pat. No. 5,657,681) discloses a hydraulic drive system comprising a plurality of hydraulically driven piston units with cam rollers, which are disposed to act against a lobed cam profile of a cam curve element, so that linear movement of the cam rollers against the cam profile produces a relative driving movement between the cam element and the piston units. The characterizing feature of the invention is that the drive system is composed of separate, assembled cam curve element modules and separate assembled piston units.

Reboredo (U.S. Pat. No. 5,689,956) discloses a hydraulic variable speed drive assembly including a hydraulic pump having a cylinder with an associated end cover, a hydraulic motor having a cylinder with an associated end cover, and an intermediate plate with ports or passages for enabling a flow of fluid from the hydraulic pump to the hydraulic motor at a high pressure and from the hydraulic motor to the hydraulic pump at a low pressure, in order to close the circuit. The shafts of the rotors of the hydraulic pump and the hydraulic motor have a common geometric axis, static with respect to the outside, about which they can rotate independently, this rotation being their only possible movement. The variable drive assembly has as its only possible movement, the rotation about a geometric axis fixed with respect to the outside and is different from the geometric axis of the hydraulic pump cylinder, from the geometric axis of the hydraulic motor cylinder, and from the common geometric axis of the rotors. The rotation of the variable drive assembly is effected from the outside and results in that the hydraulic pump cylinder and the hydraulic motor cylinder approach or withdraw their geometric axes with respect to those of their corresponding rotors, thus causing variation of the ratio between the rotation speeds of the hydraulic pump rotor and of the hydraulic motor rotor.

Folsom and Tucker (U.S. Pat. No. 5,956,953) disclose an infinitely variable hydrostatic transmission that includes a radial piston pump having outwardly opening pump cylinders containing radial pump pistons, and a radial piston motor, arranged concentrically around the pump, having inwardly opening motor cylinders containing radial motor pistons. Fluid passages in the transmission intermittently connect the pump cylinders and the motor cylinders in a closed fluid flow circuit. A flexible cam ring is radially interposed between the pump and the motor in load bearing relation to the pump pistons on an inside surface of the cam ring, and in load bearing relation to the motor pistons on an outside surface of the cam ring. An input shaft is coupled in torque driving relation to the pump, and an output shaft is coupled in torque driven relation through a commutator plate to the cam ring. An adjustment mechanism is provided for adjusting the cam ring to a desired radial profile to set the transmission to a desired transmission ratio. A fluid distribution system has passages, including kidney shaped slots through the commutator plate, for fluid flow of fluid pressurized in the pump cylinders to the motor cylinders during a power stroke of the pump and motor pistons, and for fluid flow of spent fluid from the motor cylinders to the pump cylinders during a suction phase of the stroke of the pump and motor pistons. A control system adjusts the profile of the cam ring to control the transmission ratio, and a pressure compensator automatically reduces the transmission ratio when the resistance torque on the output shaft exceeds a predetermined value, as when the vehicle is ascending a steep hill.

These systems use a hydraulic pump and a system of valves to apply hydraulic power to the cam ring. Such valve systems add extra complexity to the design of these systems, and they require associated controlling mechanisms. In addition valve systems introduce some inefficiency into the device, and require maintenance.

BRIEF SUMMARY OF THE INVENTION

Thus a need has arisen for a valve-less hydraulic drive system.

The present invention comprises an input drive system, which provides a plurality of phases of oscillating fluid flow, and an output drive system connected directly to the input drive system that is powered by the plurality of phases of oscillating fluid flow.

In one embodiment, the input drive system comprises a plurality of pistons that are caused to move in a reciprocating fashion by a power source. In a preferred embodiment, the power source may be a rotating power source, such as that provided by an electric motor, a diesel or petrol engine, or a turbine system.

In a further embodiment, the input drive system comprises a cam element having a lobed profile attached to a power source; a plurality of cam rollers in contact with the cam element; and a plurality of pistons attached to one or more hydraulic fluid lines and to the cam rollers, so that a movement of the lobed profile against the cam rollers produces a plurality of phases of oscillating fluid flow in the hydraulic fluid lines, and the relative position of the cam rollers against the cam element determines a relative phase angle for the oscillating fluid flows.

In a further embodiment, the output drive system comprises one or more pistons that are caused to move in a reciprocating fashion by the oscillating fluid flow provided by the input drive system.

In a further embodiment, the output drive system comprises a cam element attached to a load; a plurality of cam rollers in contact with the cam element; and a plurality of pistons attached to one or more hydraulic fluid lines and to the cam rollers, so that a movement of the cam rollers caused by said oscillating fluid flow against the lobed profile produces a movement of the cam element.

A technical advantage of the present invention is that the input drive system is connected directly to the output drive system, thereby eliminating the need for valves.

In a further embodiment a variable gear ratio between the input drive and the output is disclosed.

In the present invention, one or both of the cam elements consist of a cam cylinder having a few different lobed cam profiles formed along the internal longitudinal surface. In order to vary the gear ratio, a cam cylinder is slid relative to its set of cam-followers/pistons. As a result, the set of cam-followers/pistons interfaces with a different one of the lobed cam profiles of the cam cylinder.

In one embodiment, the cam cylinder presents the input drive to the system, and rotation of the cylinder provides oscillation of the cam-followers in the pistons. The hydraulic fluid oscillating movement causes the other set of pistons to reciprocate against the other cam element and rotate it.

In a further embodiment, the cam cylinder represents the output from the system. Drive input is a rotating cam element which oscillates a set of cam-followers in pistons, and transfers drive through the hydraulic fluid to the other set of pistons, to rotate the cam cylinder. The variable gear ratio is achieved by repositioning the cylinder relative to the pistons so that the pistons reciprocate against different lobed profiles. The different lobed profiles within the cylinder each represent a different gear ratio.

In a further embodiment, the cam cylinder has a series of screw threads connecting the different lobed profiles to one another allowing the cylinder to be smoothly repositioned. In a further embodiment the cam cylinder has dwell sections added to aid repositioning.

In a further embodiment to obtain more gear ratio variation, both the cam elements are formed of cam cylinders containing a selection of lobed profiles.

In a further embodiment, on the drive input or output side, a plurality of cam elements each with a different profile is usable, to vary the gear ratio. Each of the profiles is compatible with the other drive cam profile, and with the number of cam/followers pistons. The cam elements are exchangable for one another. A transition area enables the cam elements to be switched. The transition area may comprise a neutral ring, for example a circle, placed temporarily in position with the set of cam-followers. However, the transition area does not contact the cam-followers, enabling the cam-followers to reciprocate freely until the transition is complete. If the cam element is a cam cylinder, the transition area would have a wider diameter than any of the cam element profiles. In a preferred embodiment, the edge of each of the cam elements is sloped. This enables the cam elements to be slid smoothly into and out of engagement with the cam element.

In a further embodiment, one or both of the cam elements are internal to the set of pistons interfacing with it. The cam element is formed as a cam shaft with a plurality of lobed profiles constructed along the cam shaft length. Each lobed profile has a different lobe height and/or number of lobes and represents a different gear ratio. The shaft may be repositioned relative to the set of pistons to vary the gear ratio. One or both of the cam elements may be a cam shaft.

In a further embodiment, the drive cam element and the driven cam element are a substantial distance from one another. In a further embodiment, the drive cam element and the driven cam element are positioned very near one another. In a further embodiment, one of the cam elements is a cam shaft and the other cam element is a cam cylinder, and the shaft is located within the cylinder. The two sets of pistons and connecting hydraulic fluid lines are all compacted into a single set of pistons with cam-followers on two sides. One set of cam-followers interfaces with the cam cylinder and the other set of cam-followers interfaces with the cam shaft. In this way drive passes from the cylinder to the shaft with a gear ratio dependant on the number and height of lobes of both cylinder and shaft, and dependent on the number of pistons. In a further embodiment, the cam cylinder and/or the cam shaft may be formed with a plurality of different lobed profiles, and a sliding mechanism allowing the pistons to interface with different ones of the profiles. When the cam-followers interface with different sections of the cylinder and/or the cam shaft, the gear ratio is changed.

BRIEF DESCRIPTION OF THE SEVERAL VIEWS OF THE DRAWING

For a more complete understanding of the present invention and the technical advantages thereof, reference is made to the following description taken with the accompanying drawings, in which.

DETAILED DESCRIPTION OF THE INVENTION

An embodiment of the present invention and its advantages are best understood by referring in more detail to FIGS. 1 through 7, in which like numerals refer to like parts throughout.

Figure 1A:
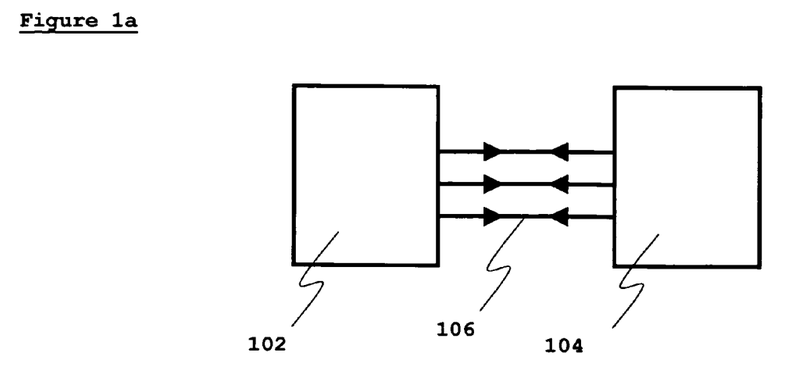
FIG. 1a is a schematic of the present invention, showing an input drive system connected directly to an output drive system by three independent hydraulic fluid lines.
Figure 1B:
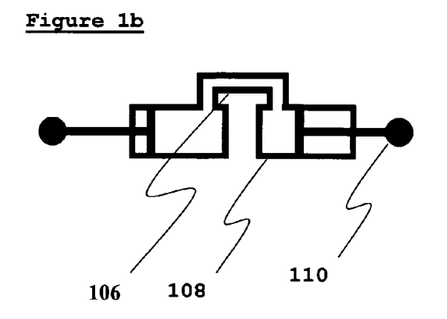
FIG. 1b illustrates simple direct coupling between two pistons, and shows their use in the polyphase hydraulic drive of the present invention.

Referring now to FIG. 1a, which shows a simple schematic of the present invention, input drive system 102 and output drive system 104, both including hydraulic elements. Input drive system 102 and output drive system 104 are connected by hydraulic lines 106. In this example, the input drive system produces three phases of oscillating fluid output, and hydraulic lines 106 consist of three fluid lines, which independently and directly feed these three phases of oscillating fluid output to the output drive system. Thus the drive and driven pistons are directly coupled by the hydraulic fluid. The connection between the hydraulic elements on the input drive side and the output drive side may be achieved in a number of ways known to the art. For example, as shown in FIG. 1b, the hydraulic elements in combination with the hydraulic lines may be dual piston units 108 with cam-followers 110 directly connected. The pistons are very simple single port pistons, with drive and driven pistons directly connected.

Figure 1C:
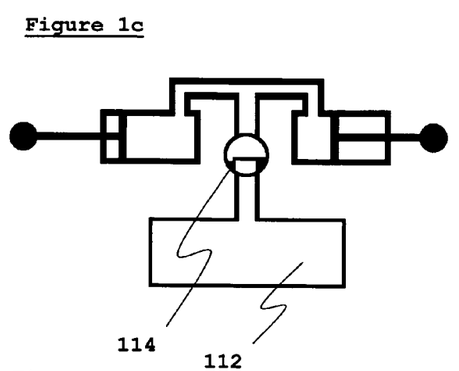
FIG. 1c illustrates a system for maintaining hydraulic fluid levels, and shows how the polyphase hydraulic drive may be used to power a linear output drive system.

As shown in FIG. 1c, the piston pair can be connected via a check valve 114 to a fluid reservoir 112, in order to compensate for leaks. If the pressure in the piston pair ever falls below the supply level, then hydraulic fluid is added to the system.

Figures 1D, 1E:
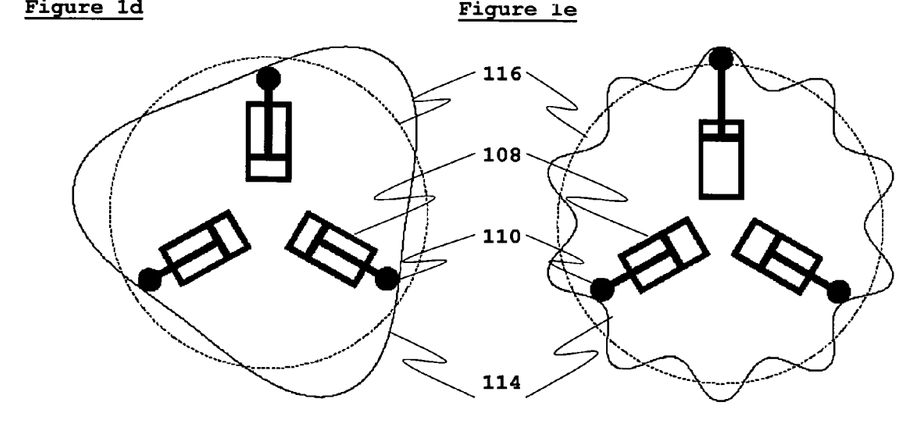
FIGS. 1d and 1e are diagrammatic representations of cam elements and cam-followers/pistons for the input and/or output drive systems of the present invention.

Referring now to FIGS. 1d and 1e, the input drive 102 and output drive 104, include drive elements as well as hydraulic elements. The hydraulic elements, such as the piston units, are actuated by a cam ring as follows: three piston units 108 are arranged as shown so that their cam-followers 110 are in contact with a cam ring 114. In this example, the input drive cam ring has 3 lobes and the output drive cam ring has 10 lobes.

The cam rings each have lobes. The height and number of the lobes on the cam ring govern the displacement of the piston in the piston units. Referring again to FIGS. 1d and 1e, the height of the cam ring, h, relative to the dashed line 116 (which is a circle) is proportional to the sine of the number of lobes multiplied by the relative angle:

$$h \alpha \sin(\text{number of lobes} \times \text{angle})$$

In one embodiment, the two cam rings are each mounted on a load-bearing axle, the axle of one cam ring forming an input shaft, and the axle of the other cam ring forming an output shaft. Each cam ring is in contact with a set of cam rollers, or cam-followers, and each cam roller is attached to a hydraulic piston. The set of cam rollers on the drive input side may be arranged radially with respect to the cam ring attached to the input shaft. As the cam ring turns, the cam rollers follow the cam ring and transmit a reciprocating motion into the corresponding hydraulic pistons. The cam rollers of the drive output side are arranged radially with respect to the cam ring attached to the output shaft. In response to the reciprocating motion transmitted from the set of pistons of the drive input side, the set of pistons of the drive output side move in a reciprocating fashion. The cam rollers of the drive output, attached to the set of pistons, cause the cam ring to turn.

The drive system does not require the use of valves. Hydraulic pistons from the input drive and the output drive are connected to each other by means of a sealed connection. In one embodiment, the input shaft is connected to an electric motor, and the output shaft is connected to a load. In combination, the drive input and output act as a transmission between the motor and the load. In another embodiment, the input shaft is connected to a source of rotational energy, and the output shaft is connected to a generator.

For the transmission and inter-conversion of rotational energy, assuming the input drive cam element has x lobes and rotates at an angular velocity of y, and the output drive cam element has a lobes and rotates at an angular velocity of b, then, discounting any transmission losses:

$$y/b = a/x$$

Figure 1F:
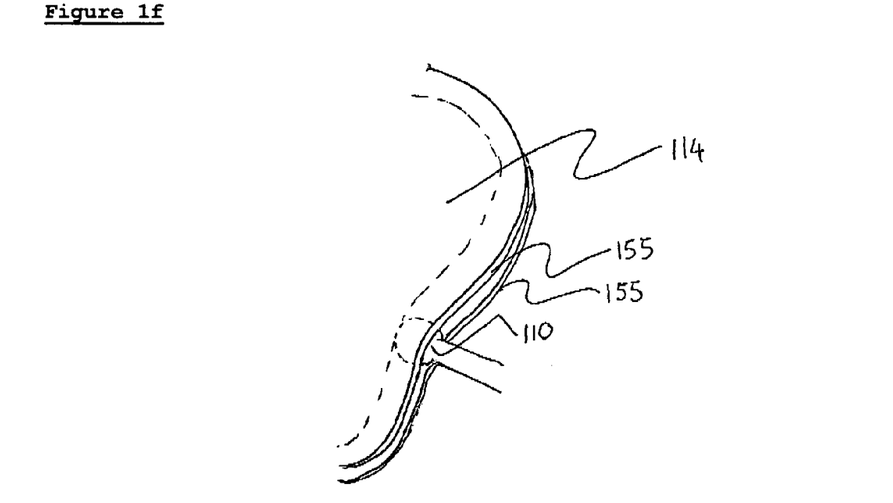
FIGS. 1f and 1g show different perspectives of detail close to an edge of a cam ring.
Figure 1G:
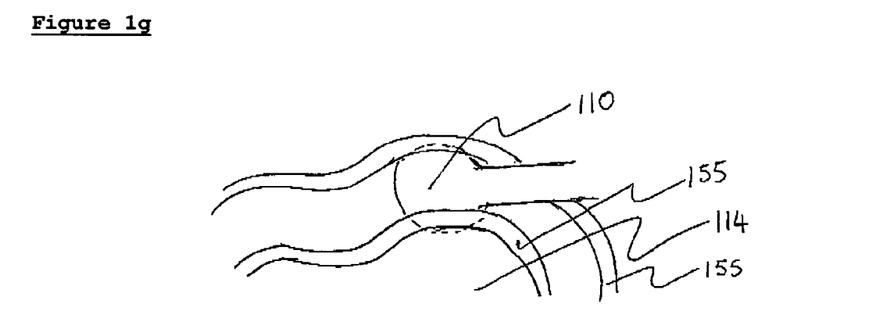
Figure 2A:
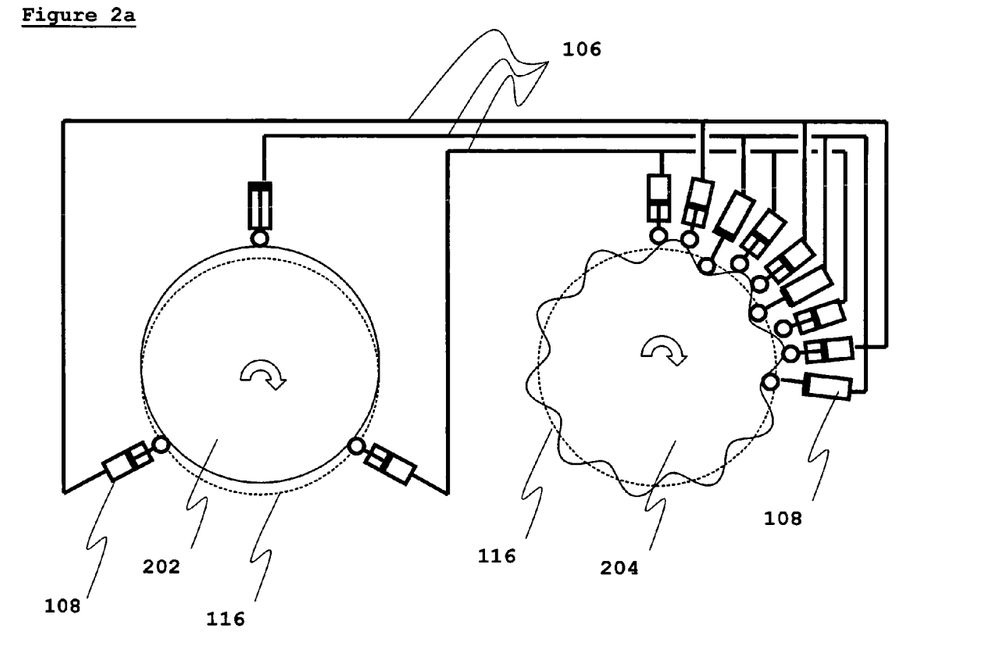
FIGS. 2a and 2b are diagrammatic representations of the present invention showing an input drive system cam ring connected to an output drive system cam ring.

Referring now to FIGS. 1f and 1g, a further embodiment includes guide 155 for forcing cam-followers 110 to stay aligned with cam ring 114. FIGS. 1f and 1g show different perspectives of detail close to an edge of cam ring 114. Guide 155 closes around cam-followers 110, and pulls cam-followers 110 back every time they are pushed out by the lobes of cam ring 114. Without the guide, the cam-followers and pistons can only push on the hydraulic fluid, or be pushed by the fluid. They cannot pull on the fluid to suck it back and create reciprocating motion. Instead what happens is that the pistons get alternately pushed by one cam or the other, with fluid return being powered by the output drive cam, pushing back on the associated output drive cam-followers/pistons. However, with the addition of guide 155, cam-followers are forced to follow the entire input drive cam profile. Guide 155 may be replaced by any other suitable mechanism known in the art that forces the cam-followers to follow a cam profile. Referring now to FIG. 2a, which shows two cam rings for a 10:1 speed reducer, cam ring 202 is part of the input drive system and has one lobe, and cam ring 204 is part of the output drive system and has 10 lobes. In this embodiment, the output drive system cam ring 204 has thirty piston/cam-followers 108 arranged evenly around the cam ring as shown, at angles of 0, 12, 24, 36 . . . etc (Only 9 are shown for simplicity). The height of the cam ring, relative to the dashed line 116, is once again shown. The relative phase angle of each piston in the output drive side is thus the angle between two pistons, multiplied by the number of lobes on the cam ring. This results in 10× angle, or in this case, 0, 120, 240, 360, 0 . . . degrees. The thirty-six cam-followers-piston units may be considered as three different phases, since every third piston/cam follower combination has the same displacement from the cam ring at all times. Since there are thus only three different phases, just 3 sets of hydraulic pipes 106 connect the input drive system and the output drive system, and each piston/cam follower feeds into one of them, according to phase. In general terms, the phase angle φ between each phase is given by:

$$\phi = 360 \times (\text{number of lubes})/(\text{number of cam-followers})$$

If 360 divided by φ, which is the same as the number of cams divided by the number of lobes, is an integer, then this value is the number of phases. The number of phases represents the minimum number of hydraulic lines needed to transmit the input to the output, and presumes that the cam-followers are evenly spaced. So in the example above, the number of phases=30/10=3. If the solution is not an integer number, then the number of phases is the lowest integer multiple of this ratio. For example, if there are 24 cam-followers and 10 lobes, then the number of cam-followers divided by the number of lobes=24/10=2.4. The lowest integer multiple of this ratio is 12, and thus the number of phases would be 12. In a further example detailed below, the number of cam-followers divided by the number of lobes=31/10=3.1. The lowest integer multiple of this ratio is 31, and thus the number of phases is 31.

The relative size of the pistons on the drive side and the driven side are selected so that the piston displacement (piston bore×stroke×number of pistons) is equal. It is not necessary that the number of piston/cam-followers on the input and output side be equal in number to one another. However, each must be at least equal to the number of phases. Preferably, each is multiple of the number of phases. A possible variation is that one or more phases is connected to fewer but larger cam-followers/piston units than the other phases.

Figure 2B:
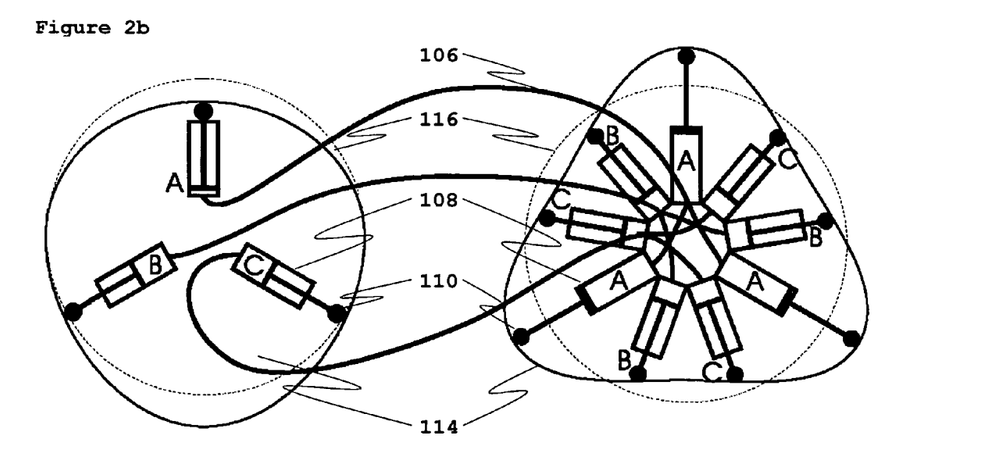

In a further embodiment, shown in FIG. 2b, and cam ring 204 has 3 lobes and is part of the output drive system. The output drive system cam ring 204 has nine piston/cam-followers 108 arranged around the cam as shown at angles of 0, 40, 80, 120 . . . degrees, etc. The phase angle of each piston in the output drive side is thus the angle multiplied by the number of lobes on the cam ring, and is therefore 3× angle, or 0, 120, 240, 360, 0 . . . degrees. Since there are thus only three different phases, just three piston/cam-followers need to be placed around the input drive cam ring, and 3 sets of hydraulic pipes 106 connect the input drive system and the output drive system. The embodiment shown in FIG. 2b is thus a 3:1 speed reducer.

In a further exemplary embodiment, if for example 31 piston/cam-followers are positioned equally around the output drive system cam ring, then the physical angle of each piston would be 11.6, 23.2, 34.8, 46.5 . . . and the phase angle would be 0, 116, 232, 348, 105 . . . which gives 31 different phases. This means that now 31 piston/cam-followers must be used on the output drive system cam ring. These are connected to the 31 pistons surrounding the input drive system cam ring by 31 independent hydraulic pipes. If the input drive cam ring has one lobe, and the output drive cam ring has 10 lobes, as in FIG. 2b, this embodiment would be present a 1:10 gear ratio connection.

Figure 3:
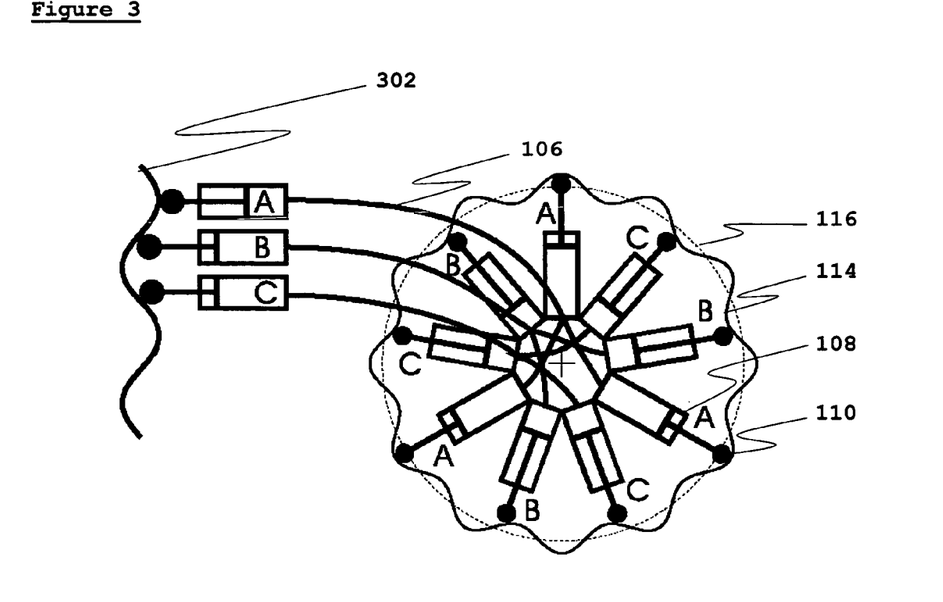
FIG. 3 is a diagrammatic representation of a linear drive system and a rotational drive system.

Referring now to FIG. 3, in a further embodiment, a linear cam 302 replaces the cam ring connected to the output shaft, and the corresponding pistons are arranged linearly; in this embodiment a linear rather than a rotational output is achieved. Thus the hydraulic drive system of the present invention may be used for the gear-less and valve-less interconversion of rotational energy, for the conversion of rotational energy to linear kinetic energy, and for the conversion of linear kinetic energy to rotational energy.

Figure 4A:
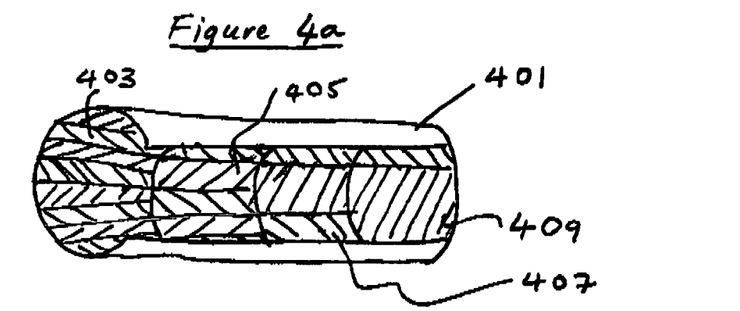
FIG. 4a is a diagrammatic representation of a sliding cam cylinder with a selection of lobed profiles of the present invention.

Referring now to FIG. 4a, the cam element is shown as a cam cylinder. Cam cylinder 401 has multiple profiles 403, 405, 407 and 409. The profiles are shown for simplicity as 'cut away', and as having sharp edges but it is anticipated that they be built in a more sinusoidal fashion, to enable smooth rotation relative to the cam-followers. One or more pistons (not shown for simplicity) are arranged as shown in FIG. 1e within cam cylinder 401. Each of the cam element sections has a different lobed profile and represents a different gear ratio. The set of cam-followers/pistons is in contact with the one of the cam element sections at a time. Cam cylinder 401 is slidable by a user relative to the set of cam-followers/pistons in order to set the gear ratio.

Figure 4B:
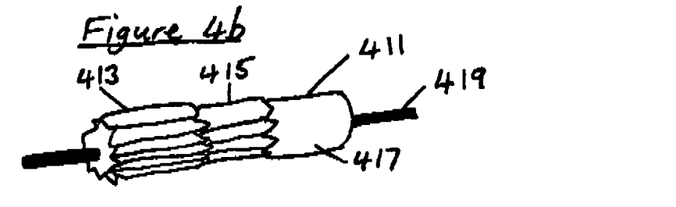
FIG. 4b is a diagrammatic representation of a sliding cam shaft with a selection of lobed profiles of the present invention.
Figure 4C:
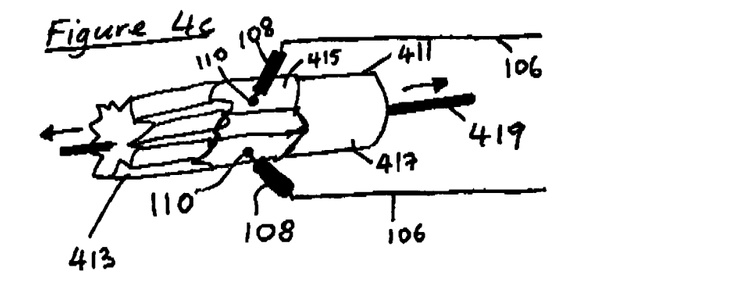
FIG. 4c is a diagrammatic representation of a sliding cam shaft in contact with cam-followers of the present invention.

Referring now to FIGS. 4b and 4c, one or both of the cam elements is formed from cam shaft 411. Cam shaft 411 contains multiple profiles 413, 415, and 417. Each of the profiles has a different lobed profile and represents a different gear ratio. Again, it is anticipated that the profiles should be more lobed and less pointy than shown. Cam shaft 411 is slidably mounted on shaft 419 so that different cam element sections may be slid into position with a stationary set of cam-followers/pistons to present different gear ratios. In addition to providing slidable positioning to cam shaft 411, shaft 419 also transmits the input or output rotational movement to or from the cam shaft 411—depending on whether cam shaft 411 is used as the input or the output drive cam element.

Referring now to FIG. 4c, the same cam shaft 411 as in FIG. 4b is repeated with the additional placement of pistons 108 shown. Pistons 108 have cam-followers 110 is contact with profile 415 of cam shaft 411. Pistons 108 are connected to hydraulic lines 106 connecting them to the second set of pistons (not shown for simplicity). Shaft 419 is driven by a power source and transmits rotary power to rotate cam shaft 411. The rotation of cam shaft 411 oscillates cam-followers 110, and sends reciprocal motive force to the other set of pistons/cam-followers, which rotate the second cam element, as shown in FIGS. 2a and 2b. In a further embodiment, the operation is reversed, and the cam shaft is used as the output drive cam element, while the input drive cam element may have multiple cam element sections too, or just have a single profile. In the case that the input drive has a single profile cam element, it is rotated by a drive source, and the associated set of cam-followers/pistons is oscillated. These transfer kinetic energy to oscillate pistons 108 and cam-followers 110 associated with the multi-profile cam shaft 411 shown. Cam-followers 110 then serve to rotate cam shaft 411 according to the gear ratio of the particular profile 413, 415 or 417 that they are juxtaposed with, and provide output to shaft 419.

Figure 4D:
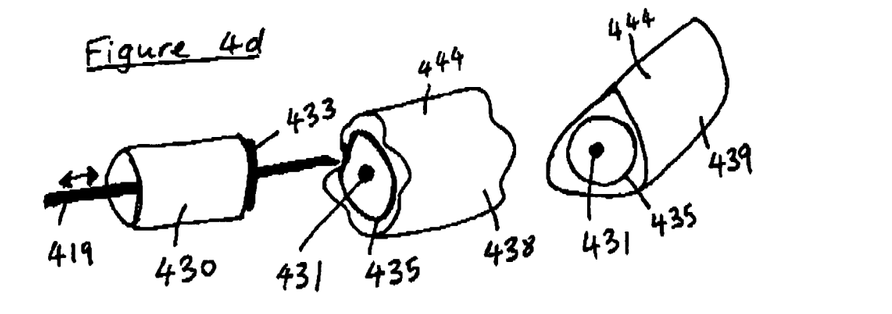
FIG. 4d is a diagrammatic representation of a plurality of profiled segments for use in one embodiment of the present invention.

Referring now to FIG. 4d, a shaft 419 is fitted with a sliding neutral cam element 430. Neutral cam element 430 provides a transition area when switching between other cam element sections. Neutral cam element 430 is designed to remain on shaft 419 but may be slid into and away from contact with a set of cam-followers/pistons. For simplicity, the cam-followers are not shown, but are arranged as in FIG. 4c. A plurality of exchangeable cam element sections 444, are provided. Each has a hollow 431, enabling it to be selectively mounted on shaft 419. The exchangeable cam element sections 444 include for example 5-lobe section 438 and 3-lobe section 439. When no cam element section 444 is mounted, neutral cam element 430 is positioned to contact the cam-followers. When it is desired to use one of the cam element sections 444, to provide a certain gear ratio, the desired section is mounted onto shaft 419, and mated with neutral cam element 430. It is anticipated that the system will probably need to be stopped before the cam element sections can be slid into or out of position. Cam element section 444 is then slid into position with the cam-followers/pistons. Neutral cam element 430 comprises an annular ring 433, which extends for interlocking with a groove 435 in the cam element sections 444. Methods for mating sections are well known in the art, and any applicable method may be used in place of annular ring 433 and groove 435. In order to switch between different sections, first neutral cam element 430 is slid into active position with the cam-followers, and then cam element section 444 is removed, from the shaft 419, and replaced by another one. Using the neutral cam element 430 as the active cam element whilst the cam element section 444 is switched, may help to maintain angular momentum, as well as providing a relatively smooth sliding interface. In a preferred embodiment, each cam element section 444, has a sloped profile that gradually reduces the number of lobes to one lobe, around the edge that is intended for mating with neutral element 430. As cam element section 444 and the neutral element are slid between active position with the cam-followers, the sloped profile provides a gentle transition.

Figure 5:
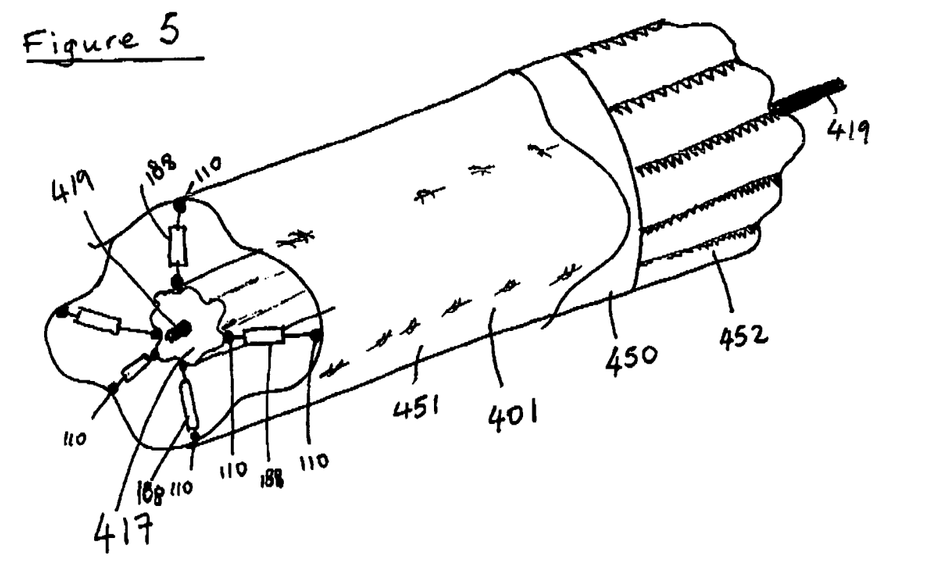
FIGS. 5-7 are diagrammatic representations of multi profiled cam cylinder and cam shaft combination.

Referring now to FIG. 5, one of the cam elements is a cam shaft 417 and the other cam element is a cam cylinder 401. Cam shaft 417 is fixedly mounted on shaft 419 and located within cylinder 401. The two sets of pistons/cam-followers and connecting hydraulic fluid lines are all compacted into a single set of pistons 188 having cam-followers 110 on two sides. The outside set of cam-followers interfaces with cam cylinder 401 and the inner set of cam-followers 110 interfaces with cam shaft 417. In this way drive passes from the rotating cam cylinder 401 to shaft 419 (or the reverse). The gear ratio is dependant on the ratio between the number of lobes of the cylinder and shaft.

For this concentric arrangement, in which the same number of cam-followers engage with two different profiles, and where the inner piston directly drives the outer piston (or the reverse) at the same radial angle, the number of pistons and the number of lobes on the inner and outer cam profiles need to be appropriately matched. Essentially, since the angles are fixed, the two sets of lobes need to each alias to the same number, relative to the number of cam-followers. Cam-followers are able to accurately sample a cam profile that has up to half the number of lobes as cam-followers. As the number of lobes in a cam profile is increased beyond half the number of cam-followers, the output from the cam-followers is indistinguishable from an output of a cam profile with fewer lobes. As long as the cam-followers sample the two profiles to produce an output that aliases to the same number, the two profiles can be operated by the same set of cam-followers. If the two profiles do not alias to the same value, the relationship will be skewed, and the cams will not rotate together evenly. The two cam profiles are said to alias to the same number if they satisfy the following constraint:

R=FN+X, where R is the number of lobes on the one cam, N is a positive integer, F is the number of cam-followers, and X is the number of lobes on the other cam.

For example, with a setup that includes 18 radial cam-followers/pistons, with a first cam profile has 2 lobes, the second cam can have a profile with any multiple of 18 lobes plus or minus 2. The second cam may have two, sixteen, or twenty lobes, etc.

In a further embodiment, cam shaft and/or cam cylinder 401 may be provided with a number of cam element sections that may each be slid into active position with the cam-followers. FIG. 5 demonstrates this by showing cam cylinder 401 with three cam element sections, 450, 451 and 452. When it is desired for a certain profile to be used, a sliding mechanism (not shown) slides the cam element sections, relative to the cam-followers. This sliding allows cam-followers/pistons to interface with different ones of the profiles. As mentioned, when using two profiles and the same number of cam-followers for each profile, the two cam profiles used at any one time must be related to one another in terms of the number of lobes of each cam aliasing to the same number. The gear ratio may be changed by selecting a different pair of profiles of cam cylinder 401 and/or cam shaft 417.

In order to enhance transition between cam element profile sections, one or more of a number of transition embodiments may be employed. A cam element is formed with multiple profiles and between each pair of profiles is a transition section. In a first transition embodiment, as shown in FIG. 5, the transition section is composed of a single lobe section 450. This section is provided and repeated between every other pair of profiles to smoothen transition.

In a second transition embodiment, the transition section is shaped to gradually morph one shape into the other.

In a third transition embodiment, all of the profiles of both cam cylinder and cam shaft alias to the same value, relative to the number of cam-followers. This makes it possible to transition from profile to profile.

In a fourth transition embodiment, there are various points of symmetry at which the various profiles line up, so that the cam-followers can be slid over from one cam section to the other. The cam-followers in contact with a cam element from a rigid surface. If one wants both sets of cam-followers to remain in contact with both cam elements, for a transition, then the transition must occur at a place where the cam-follower values don't change from one cam element to the other, as they are slid past. For example, a profile with one lobe, and a profile with five lobes will have the same values at 0 degrees, 90 degrees, 180 degrees and 270 degrees. In certain cases this might actually reverse the direction of operation.

Figure 6:
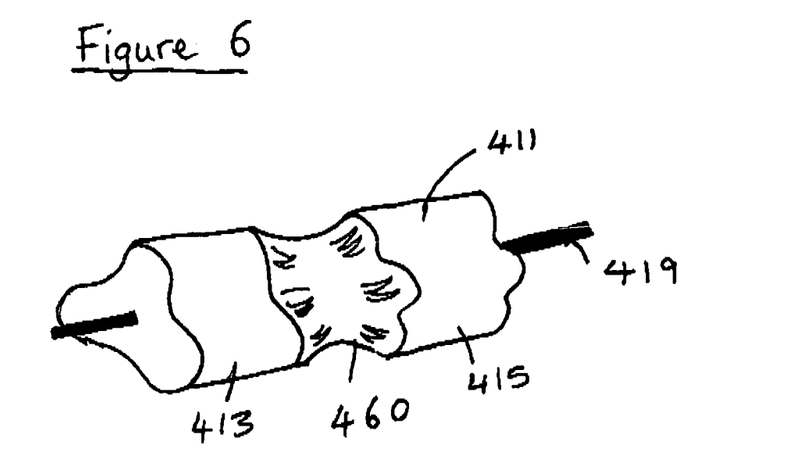

In a fifth transition embodiment, as shown in FIG. 6, cam shaft 411 has a transition section sloping area 460 between each set of adjacent profiles, such as cam element sections 413 and 415. Sloping area 460 have a radius at least as small as the smallest radius of the pair of profiles. Sloping area 460 eases transition and helps maintain momentum as cam shaft 411 is slid relative to the pistons, to switch between profile 413 and profile 415 being in contact with the pistons disposed relative to it. In general, the sloping transition region must go through a point where the cam ring is not pushed in any way, which means that the radius needs to be minimum if the cam-followers are on the outside of the cam element, but maximum if the cam-followers are on the inside. The diameter needs to be enough that the cam-followers do not interfere with the two different cam profiles.

In a sixth transition embodiment, the cam cylinder has a series of threads connecting the different lobed profiles to one another allowing the cylinder to be smoothly repositioned. In a further embodiment the cam cylinder has dwell sections added to aid repositioning.

In a seventh transition embodiment, a pair of profiles do not alias to the same number with the cam-followers that are in place, yet if the number of cam-followers is doubled or tripled, the two profiles may be used.

In an eighth transition embodiment, a valve (114)/reservoir system (112) is added to the hydraulic lines. This system may be used to keep the pressure topped up as shown in FIG. 1c. In addition, the valve/reservoir system may also be used to actively reduce the volume of the hydraulic fluid while profiles are being switched. When the hydraulic fluid volume is reduced, the cam-followers all retract, and it may be easier to switch between profiles.

In a ninth transition embodiment, each profile is equipped with a guide to hold the cam-followers normal to the profile axis. The guide is shown in FIGS. 1f and 1g. The guide may further contain openable avenues leading from one cam element section to another. There must be at least one avenue per cam-follower, and arranged with an angular distance equal to the angular distance between cam-followers. The avenues are closed during regular operation and are opened during transition between sections.

In a further embodiment, a ratchet system may be added to prevent the system from reversing. Precautions may be taken against standing waves in the hydraulic fluid. Alternatively, the system may be set up so as to be able to operate in reverse.

The system may be linear to linear, rotational to rotational, or any combination. The cam shaft or cylinder described may be replaced with a linear version having multiple lobed profiles. The profiles may be fixed or flexible. For example a linear cam profile may be held in position at one end by a slidable clamp. The sliding of the clamp acts to stretch or shorten the lobe length, effectively varying the gear ratio. In order to change the lobe length, the position of the cam-followers needs to change as well.

Figure 7:
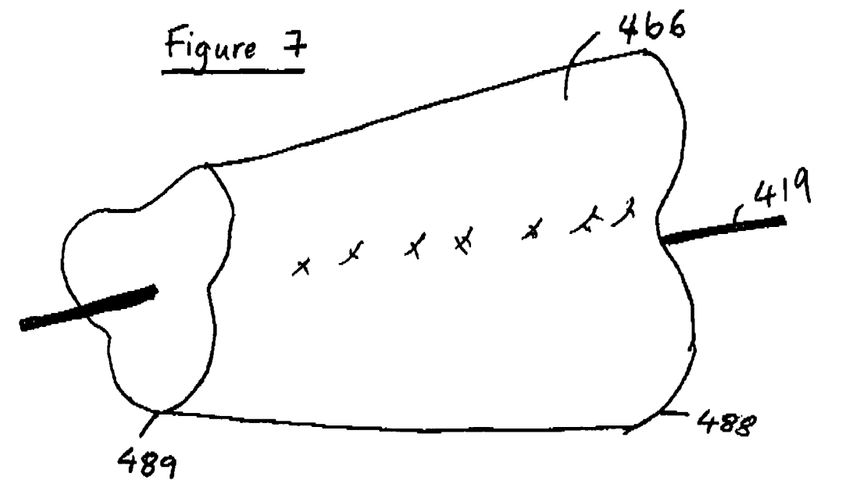

Referring now to FIG. 7, cam shaft 466 (or cylinder or linear equivalent) is provided as a variable torque output cam element. Shaft 466 has three lobes across its whole length but is conical, so that the lobes at wide end 488 of cam shaft 466 are substantially larger than those at narrow end 489 of cam shaft 466. The cam-followers are arranged around the periphery of cam shaft 466. Shaft 466 may be slid relative to the position of the cam-followers, and the volumentric displacement of the cam-followers will depend on the diameter of the shaft they are currently engaged with. The torque output of the drive will vary according to the displacement of the cam-followers. Thus at wide end 488 torque output will be high whereas if the cam-followers are engaged with narrow end 489, the torque output will be low. This may be a useful model for constant speed, variable torque applications. Cam shaft 466 may be used as the input or output drive cam element.

An elegant configuration for rotational-rotational mode seems to be to place all the pistons, for both input and drive, into a single stationary ring between the input and output curves, as shown in FIG. 5. You could then route all the fluids through a single mass of metal, requiring no exposed tubing. The forging and machining required may be complex but are within the range of current state of the art.

The number of cam-followers/pistons in the drive and output may be equal, or the one may be a multiple of the other. For example, if there are N pistons on the input side, these may be connected to M evenly distributed pistons on the output side, where M is equal to, or a multiple or divisor of N.

In the foregoing, the pistons are shown in the diagrams schematically and all have similar dimensions; however, the stroke of the pistons need not be the same. The only things that must match between the drive and the driven side are: (a) the number of phases must be the same, and (b) within each phase, the volume displaced by the driven and the drive side must be the same. In FIG. 2, the diameter of the input drive and the output drive cam rings are shown to be roughly equal; however it is not outside the scope of the present invention for the diameter of the cam elements, and the amplitude of the cam profiles to be different.

In a further embodiment multiple stages are provided, in which each cam element drives a further set of cam-followers and a further cam element.

It has been described as the cam-followers remaining stationary, and the cam elements turning. Each set of cam-followers should preferably be held firmly in position by a retaining ring. In a further embodiment, one of the cam elements are stationary, and the retaining ring holding the cam-followers is allowed to rotate, together with the reciprocating cam followers. This is similar to an epicyclic gear system. In a further embodiment, both cam elements are held stationary, and both retaining rings are allowed to rotate. In these embodiments, the rotating retaining ring provides the driven input or output, as opposed to the cam elements.

In the foregoing, the cam rings and pistons are shown to be radial to the drive or output shafts, but they could also be axial, with cam-followers/pistons parallel to the axis of rotation and a cam ring of constant radius but changing thickness. The cam element has a surface similar to a fairground merry-go-round. As shown in FIG. 3, the cam element need not be a ring; it could be a wavy surface, for example, an elevator linear actuator.

The drive system of the present invention may be used in a number of applications where hydraulic transmission systems are currently used, for example in hoists and generators. Advantageously, the present invention does not use valves and thus is simpler to operate and maintain. However, as mentioned above, the hydraulic lines and/or pistons may be supplied with a combination reservoir/valve to maintain pressure against potential leakage.

The invention claimed is:

1. A variable gear hydraulic drive system comprising:
   (a) an input drive system comprising:
      (i) a first cam element having a first lobed profile moved by a power source;
      (ii) a first set of pistons comprising hydraulic fluid and cam-followers which are disposed to act against said first cam element so that the movement of the first lobed profile against the cam-followers applies pressure to the hydraulic fluid; and
   (b) an output drive system comprising:
      (i) a second cam element having a second lobed profile;
      (ii) a second set of pistons comprising cam-followers disposed to act against said second cam element, wherein said second set of pistons comprise hydraulic fluid and each piston of said second set of pistons is connected to at least one of said first set of pistons with a hydraulic fluid line so that pressure applied to the hydraulic fluid is applied to the cam-followers of said second set of pistons, and wherein said cam-followers of said second set of pistons are disposed relative to the lobed profile of said second cam element to move said second cam element according to the lobed profile of said second cam element and applied pressure; and
   (c) at least one further cam element, interchangeable with one of said first and second cam elements, wherein said at least one further cam element comprises a different lobed profile to the interchanged cam element;
   wherein said input drive cam profile and said output drive cam profile are formed as shaft and cylinder coaxial to one another.

2. The variable gear hydraulic drive system of claim 1 wherein said first and second sets of pistons are compacted into a single set of units, each of said units containing two pistons, and wherein said input drive cam element, said output drive cam element, and said at least one further cam element each comprise a profile with a number of lobes that alias to the same number, based on the number of pistons of each set of pistons.

3. The variable gear hydraulic drive system of claim 2 wherein said interchanged cam element and said at least one further cam element comprise a plurality of profiles along said shaft or said cylinder.

* * * * *